COMBINED DIRECT CURRENT REINSERTER AND VARIABLE THRESHOLD SYNCHRONIZING SIGNAL SEPARATOR

Filed Nov. 30, 1950

INVENTORS
CLYDE W. HOYT
& LUCIUS P. THOMAS, JR.
BY [signature]
ATTORNEY 2,718,550

COMBINED DIRECT CURRENT REINSERTER AND VARIABLE THRESHOLD SYNCHRONIZING SIGNAL SEPARATOR

Clyde W. Hoyt, Pennsauken, and Lucius P. Thomas, Jr., Collingswood, N. J., assignors to Radio Corporation of America, a corporation of Delaware Application November 30, 1950, Serial No. 198,371

9 Claims. (Cl. 178—7.3)

Figures 1, 2:
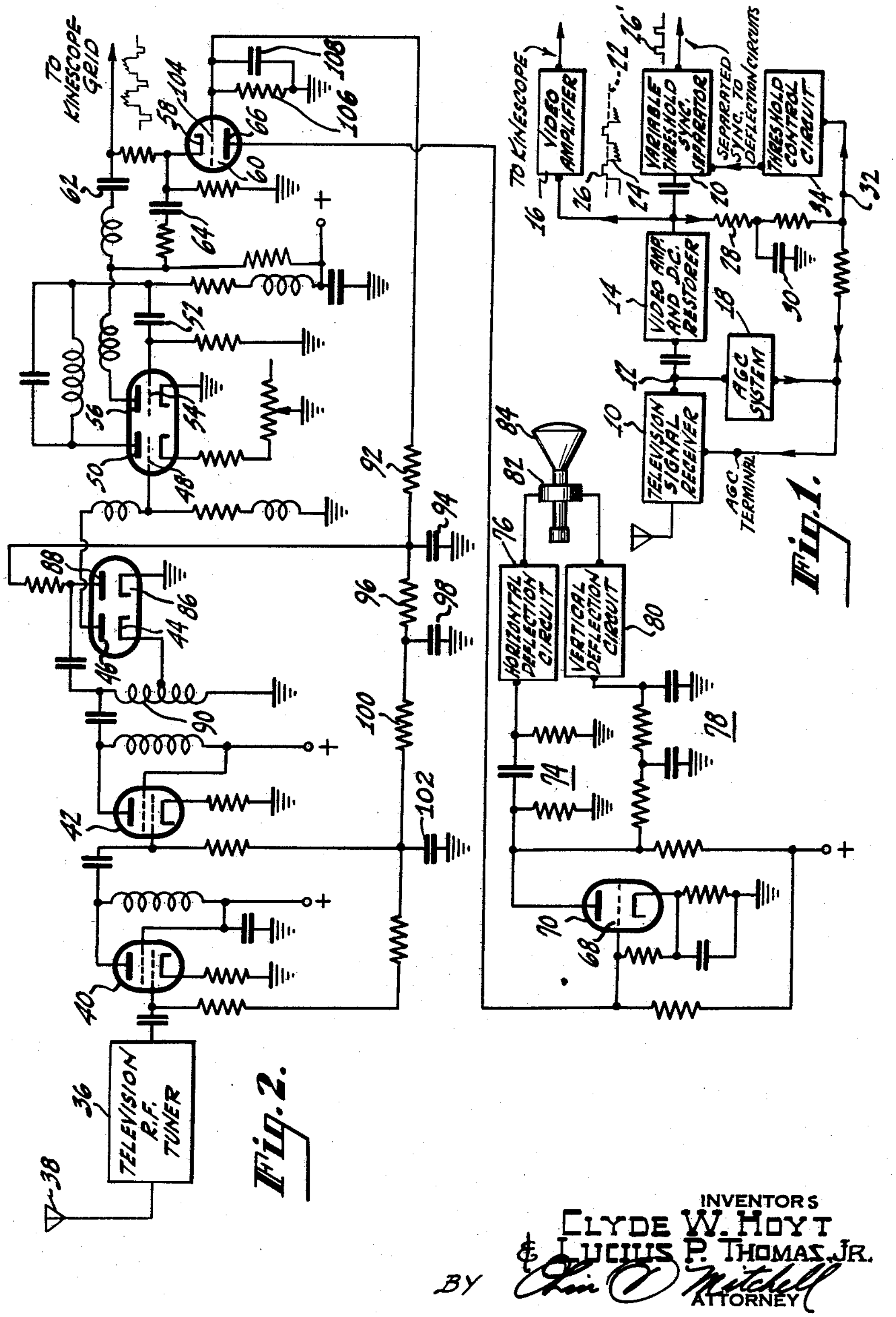

The present invention relates to improvements in radio receiving systems of the type adapted to receive and demodulate composite intelligence signals having a synchronizing component represented by high amplitude variations with lower amplitude variations representing another type of information and relates more directly although not necessarily exclusively, to radio receivers adapted to receive and demodulate television signals of the type now utilized in commercial television broadcasting.

In more particularity, the present invention relates to improvements in circuit techniques and processing of standard broadcast television signals so as to improve the precision with which the synchronizing component and the video component of these signals are separated.

The present invention further relates to improvements in the design in manufacture of television signal receiving circuits so as to allow a greater dynamic range of television signal amplitudes and brightness changes to be successfully received and reproduced.

Perhaps nowhere in the electronic art is the demand greater for precision signal processing at low costs than in the manufacture of television receivers. As is well-known by those skilled in the art the present day standard television signal comprises two main portions which are distinguishable from one another by both waveform and amplitude.

These portions are usually called the synchronizing component and the video component. It is the purpose of the synchronizing component to maintain synchronism between the television transmitter image scanning device and the television receiver signal reproducing device so that the picture elements defined by the transmitter will be properly positioned in the television receiver picture raster. The video component, representing lower amplitude variations, of course represents the brightness of each element in the picture as scanned at the transmitter and as reproduced at the receiver.

In order to prevent interference between the video component and the synchronizing component at the receiver it is necessary, in the processing of the television signal to separate these components one from the other. This is most commonly done on an amplitude basis. Synchronizing information being pulse like in form generally represents 100 percent modulation of the television carrier while peak video information seldom rises above 75 percent modulation of the television carrier. The basic system of amplitude separation of the synchronizing component of the television signal is beset by a number of problems when subjected to variations in the amplitude of the signal as received by the receiver, these variations being caused by interference, fading, etc.

In order to minimize the effects of signal fading on synchronizing signal separation in television receivers, as well as the visual effects of fading on the reproduced image, automatic gain control circuits are now in wide use. These circuits generally sample the amplitude of the demodulated television signal and control the gain of the receiver in a manner which is inversely proportional to the increase or decrease of the demodulated signal above or below a predetermined standard. However, unless considerable expense is tolerated these automatic gain control (AGC) circuits are not perfect in their action, especially under conditions of extremely low signal strengths and extremely high signal strengths. The basic amplitude discriminatory or threshold device used as a synchronizing signal separator although being supplied with the AGC regulated signal will tend, with the imperfect action of the AGC circuit, to provide insufficient sync at low level signals (along with excessive noise) while producing too much signal separation at high level signals thereby tending to include some video information along with the separated sync.

Another disadvantageous effect commonly present in television receivers even though equipped with automatic gain control circuits, is that of overload of the kinescope and distortion of synchronizing waveform as a result of large changes in picture brightness. This is especially true when receiving high level television signals. If the contrast control of the television receiver has been set for rather low level picture brightness so as to produce suitable contrast, a very marked degree of increase in picture brightness may produce blooming of the kinescope electron beam as well as overloading of certain circuits handling the video signal and its associated synchronizing component.

It is therefore a purpose of the present invention to provide an improved synchronizing signal separator circuit for television receivers so as to minimize the effects of signal strength variations on the nature of the synchronizing signal separated.

It is further an object of the present invention to provide an improved regulated circuit for television receivers which acts to minimize the deleterious effects of amplifier saturation in response to high level signals on the nature of the synchronizing signal provided by the synchronizing signal separator of the receiver.

It is a still further object of the present invention to provide a signal correcting circuit for application to television receivers so as to increase the dynamic range of signal amplitudes successfully capable of reception by the television receiver.

It is another object of the present invention to provide a correcting circuit for application in television receivers which will minimize the deleterious effects of large changes in average picture brightness both upon the appearance of the reproduced picture as well as the accuracy and the successful separation of undistorted synchronizing components from the video signal.

In the realization of the above objects and features of advantage the present invention in one of its more general forms contemplates the use of a sync separator circuit having a controllable threshold which permits the amplitude level below which the separator circuit will not pass signals to be controlled. This threshold level is then controlled as a joint function of the television signal amplitude received by the receiver and the D. C. picture information or average brightness of the scene. The invention further contemplates the use of an automatic gain control circuit to derive the aforementioned information as to the amplitude of the received television signal. Overload compensation by the present invention is then provided by supplementing the automatic gain control voltage applied to the television signal amplifiers of the receiver by a small amount of D. C. picture information. Thus both the sync separator clipping threshold and the automatic gain control voltage of the television receiver are made a function of average picture brightness and the peak amplitude of the received television signal.

A more complete understanding of the present invention as well as a fuller appreciation of its objects and features of advantage will be discerned through a reading of the following description especially when taken in connection with the accompanying drawing in which:

Figure 1 is a block diagram representation of one aspect of the present invention as applied to a television receiving system, Figure 2 is a schematic representation of one embodiment of the present invention as applied to a preferred form of television receiver arrangement.

Turning now to Figure 1 there is indicated at 10 a television signal receiver which includes means for receiving the radio frequency television signal and demodulating it to produce a composite television signal at the output terminal 12. The video signal appearing at 12 is then capacitively coupled to a D. C. restorer circuit which supplies D. C. picture information lost in the signal channel as is caused for example by capacitive coupling from one video amplifier stage to the next. The output of the D. C. restorer circuit is then conventionally applied to a video amplifier 16 which is direct current coupled to a kinescope (not shown). The signal of the output of the television receiver 10 is also applied to an automatic gain control system indicated by the block 18. The elements thus far described are well-known in the art and may be of any design found most convenient. Examples of suitable circuits for these purposes may be found in an article entitled "Television Receivers" by Anthony R. Wright, appearing in the RCA Review for March 1947.

According to the present invention the video signal is also applied to the input of a variable threshold sync separator circuit such as shown at 20. The variable threshold circuit is nothing more than a gate which allows the passage of signals whose amplitude exceeds a predetermined threshold value. This threshold is indicated by the dotted line 22 shown in connection with the video signal 24. The threshold sync separator 20 is adjusted such that its threshold 22 will allow only the passage of the sync 26. Thus the output of the sync separator 20 will comprise only the vertical and horizontal sync pulses of which 26′ form a part. These sync pulses 26′ are indicated as being conducted to suitable deflection circuits for synchronization thereof. The threshold of the sync separator 20 is in accordance with the present invention controlled by two influences. First the D. C. picture information appearing at the output of the restorer 14, second the automatic gain control information appearing at the output of the AGC system 18. The filtering network comprising resistor 28 and capacitor 30 act to keep video frequency fluctuations from appearing at the input of the terminal 32. By way of convenience the threshold control voltage appearing at 32 is adapted to control the threshold of the sync separator 20 by means of the threshold control circuit 34.

The operation of this aspect of the present invention is substantially as follows: Assume that the television signal received by the receiver 10 drops in amplitude and that the AGC system 18 is unable to fully compensate for this drop in input signal. The video signal applied to the variable threshold sync separator 20 will then drop somewhat and if the clipping threshold 22 were kept constant the result at the output of the sync separator would be a reduced amplitude of separated sync. However, the AGC system has acted to increase the gain of the television receiver to its maximum and the control voltage to the threshold control terminal 32 will be at its least negative value. If the threshold control circuit 34 is phased so as to lower the threshold 22 in response to this less negative AGC voltage the result will be a greater amplitude of separated sync 26′. The D. C. picture information applied to the control terminal 32 of course maintains the threshold 22 in the proper relation to the AGC axis of the video signal 26 to always pass a given amount of sync amplitude regardless of scene brightness.

It is thus seen that with the proper voltage phases established in the circuit of Fig. 1 the present invention will improve the accuracy of sync separation to quite an extent. However, another improvement provided by the arrangement of Fig. 1 flows from the application of D. C. picture information to the AGC system. This advantage is most apparent upon the change of average picture brightness from low intensity to high intensity. Consider for example, that the television receiver has been adjusted to give good contrast rendition for a motion picture film television program of a rather low average brightness through the entire film. If the contrast of the receiver had been adjusted under these conditions to where the kinescope was being driven to a white value just short of blooming, it would follow that considerable brightness distortion and beam defocussing would occur if an advertisement or other scene having considerably more average brightness than the motion picture film were transmitted. The application of D. C. picture information to the television signal receiver AGC terminal tends to overcome this by causing the AGC bus to swing negatively as the picture brightness increases. The resulting decrease in gain of the television receiver causes a degree of compression to be imposed on the video signal so that the "whites" of the brighter picture will not drive the kinescope into an overload condition.

The variable threshold sync separator 20 may take various forms and may be nothing more than a diode having means for controlling conduction threshold bias thereon. A more elaborate form may include a triode whose anode-cathode conduction voltage is determined by a variable bias imposed on the grid of the triode.

Although the present invention may be successfully applied to a number of television receiver circuits, the arrangement shown in Figure 2 will assist in understanding the application of the present invention to television receiver circuits of more modern design. The arrangement shown in Figure 2 comprises a television R. F. tuner 36 adapted to receive radio frequency television signals from the antenna 38. The R. F. tuner 36 includes conventional superheterodyne circuits well known in the art. The R. F. tuner is of course followed by I. F. amplifiers 40 and 42. The output of I. F. amplifier 42 is coupled to the cathode 44 of the detector diode 46 which produces demodulated video signals having D. C. picture components present. This video signal is coupled to the grid 48 of the first video amplifier 50. The output of the video amplifier 50 is capacitively coupled by a capacitor 52 to the grid 54 of the second video amplifier 56. The video signal appearing at the output of the video amplifier 56 is suitably coupled to the control grid of the kinescope and also to the cathode 58 of sync separator triode 60. The signal to the sync separator triode 60 as well as the kinescope is coupled by way of capacitors 62 and 64.

The anode 66 of the sync separator triode 60 is conventionally coupled to the grid 68 of a sync amplifier tube 70. The output of this sync amplifier 70 is then applied through a differentiating network 74 to the horizontal deflection circuit 76 and also through integrating network 78 to the synchronizing terminal of the vertical deflection circuit 80. The output of the horizontal deflection circuits are of course conventionally coupled to a deflection yoke 82 serving to deflect electron beams within the kinescope 84. The automatic gain control action in the television receiver is also achieved by a well known arrangement of a diode 86 having its anode 88 capacitively coupled to the upper end of inductance 90. The AGC potential developed results from the peak detection of incoming sync signal as defined by the I. F. amplifier and is developed in part from the diode current flow through the resistor 92. Capacitor 94, resistance 96, capacitor 98, resistance 100 and capacitor 102 all serve to reduce ripple in the resulting AGC voltage. A description of the operation of the AGC circuit as well as the detector and the general television system thus far described in connection with Figure 2 is found in an article entitled "Radio Set and Service Review" appearing in the Radio Electronics magazine November, 1950, issue between pages 34 and 36.

According to the present invention the grid 104 of the sync separator triode 60 previously described is connected with ground through the combination of resistance 106 and capacitor 108. A further connection is provided between the grid 104 and the AGC bus of the television receiver through the aforementioned resistor 92.

The operation of the present invention is substantially as follows: During reception of the television signal the grid voltage appearing at the grid 104 of tube 60 is negative as a result of grid current flow corresponding to the negative sync peaks of the video signal applied to the cathode 58. The impedance of the resistance 106 and capacitor 108 increases the cathode impedance 104 to lower frequencies such as for example vertical sync. This tends to compensate for the reactance drop across coupling capacitor 64 which is greater for vertical sync frequencies than horizontal sync frequencies. By adjusting the constants of the circuit the negative bias on the grid 104 will be such to allow conduction in the tube 60 only for negative signals in excess of video signal blanking as applied to the cathode 58. Thus separated horizontal and vertical sync will be applied to the grid 68 of the sync amplifier 70. Since the bias on grid 104 results from grid current conduction and hence clamping of the incoming video signal as applied to the cathode 58 the voltage at the grid 104 will represent D. C. picture information. As above described, this D. C. picture information is applied to the AGC bus through the resistor 92. In the particular circuit shown it is apparent that the resistor 106 is common to both the means for generating D. C. picture information as well as the means for developing AGC picture voltage.

Should then the incoming signal to the television receiver increase the amplitude the AGC voltage applied to the AGC bus will swing negatively to decrease the gain of the I. F. amplifiers 40 and 42. However, it is not contemplated that this reduction in gain of the amplifiers 40 and 42 will adequately regulate the amplitude of signal applied to the cathode of sync separator tube 60. Hence a part of the negative going AGC voltage is communicated to the grid 104 so as to cause the sync separator tube to delay conduction until the video signal applied to the cathode 58 swings the cathode more negatively than previously necessary for this conduction. This will prevent peaks of video signal from getting into the separated sync. The reverse action of course occurs should there be a decrease in signal level. The AGC bus potential will then swing in a positive direction and the sync separator tube 60 will conduct at lower levels of negative potential as a result of this positive going AGS voltage.

Furthermore, it can be seen that for a given intensity of incoming signal having a certain brightness level, an increase in the brightness level will cause a more negative voltage to be developed on the grid 104 of the separator tube 60. This will cause the AGC bus voltage to swing in negative direction and decrease the gain of I. F. amplifiers 40 and 42. This will have a compression effect on the incoming video signal so that the increase in brightness will not cause the "whites" to drive the kinescope grid into overload. Moreover, in the particular circuit shown in Figure 2 the D. C. picture information applied to the kinescope grid results from grid current conduction by the second video amplifier tube 56. An excessive increase in picture brightness will then cause the grid 54 to be driven further into conduction by positive going sync peaks. This increase in conduction will if of sufficient magnitude destroy the contour of the sync waveform as applied to the sync separator tube 60. This will then cause improper sync separation and missynchronization of the horizontal and vertical deflection circuits. The operation of the present invention of course successfully prevents such contingencies.

From the foregoing it can be seen that the applicants have provided a simple and effective compensating system for television receivers which accomplishes all of the objects set forth hereinabove in such a way as to improve the overall quality of the received television picture and to increase the dynamic range of signals to which the television receiver will satisfactorily respond.

Having thus described our invention what we claim is:

1. In a television receiving system the combination of, means for receiving and demodulating a television transmission signal to obtain at its output a composite video signal, a variable threshold synchronizing signal separator circuit having its input coupled to the video output of said receiving means, automatic gain control voltage generating means coupled with the output of said receiving means to produce a control voltage whose value varies with received signal strength, direct current picture information restoring means coupled with the output of said receiving means for developing a varying unidirectional potential representative of average picture brightness, means connected with said synchronizing separator for varying the clipping threshold thereof in accordance with a clipping control signal, means for combining the gain control voltage with said brightness information varying unidirectional potential to form a clipping control signal, and means connecting said combining means to said means for varying the clipping threshold for applying said clipping control signal to said synchronizing signal separator to control the clipping threshold thereof.

2. In a television reproducing system, a signal input terminal adapted to receive a composite television signal having a synchronizing component represented by peak excursions of the television signal extending beyond the peaks of video signal information, said video signal representing a scene having a certain contrast and average brightness, an amplitude discriminatory circuit permitting passage of only applied signals having an amplitude in excess of a prescribed threshold value, a connection from said signal input terminal to the input of said discriminatory circuit, means for varying said threshold value in accordance with a threshold control signal, means connected with said signal input terminal for developing a primary voltage which is a function of peak values of said synchronizing component, means connected with said signal input terminal responsive to said video signal to develop a secondary voltage as a function of the average brightness of the television scene, and means combining said primary and secondary voltages and connecting the combined voltages to said threshold varying means as a threshold control signal therefor.

3. In a television receiving system adapted to receive a television signal including a synchronizing component and average brightness component, the combination of a signal amplifier adapted to process received television signals, means including a gain control terminal for controlling the gain of said amplifier in accordance with an automatic gain control voltage applied to said terminal, a variable threshold synchronizing signal separator circuit coupled with the output of said amplifier for separating television synchronizing signal from received television signal, a threshold control means for said synchronizing signal separator circuit including a threshold control terminal for controlling the clipping threshold of said synchronizing signal separator in accordance with a threshold control signal applied to said threshold control terminal, an automatic gain control voltage generating circuit connected with the output of said signal amplifier, means coupled with the output of said amplifier for developing a direct current picture information signal representing the average brightness component of the received signal, and connections between the outputs of said gain control voltage generating circuit, said direct current picture information signal developing circuit, and said threshold control terminal.

4. In a television receiving system, adapted to receive a television signal including a synchronizing component and average brightness component, a signal amplifier adapted to process received television signals, means including a gain control terminal for controlling the gain of said amplifier in accordance with a control signal, means coupled with the output of said amplifier for developing a direct current picture information signal representing the average brightness component of the received signal, and connections between the output of said direct current picture information signal developing means and said gain control terminal.

5. A synchronizing signal separator circuit for a television signal, said circuit comprising in combination, a signal ground, an input terminal referenced to said ground adapted to receive composite television signal including a periodically recurrent synchronizing component being represented by peak signal excursions extending beyond peak excursions of the video component, an electron discharge tube having at least an anode, cathode and control electrode, a load circuit connected between said anode and cathode and also with said ground, a resistance-capacity time constant circuit connected between said control electrode and said ground, a capacitor connected between said anode cathode load circuit and said input terminal, the connection of said capacitor being such as to induce increase current flow in said discharge tube during peaks of synchronizing component, and a signal amplifier having its input connected with said control electrode and its output connected with said input terminal.

6. A synchronizing signal separator circuit for a television signal, said circuit comprising in combination, a signal ground, an input terminal referenced to said ground adapted to receive composite television signal including a periodically recurrent synchronizing component and a video component said synchronizing component being represented by peak signal excursions extending beyond peak excursions of the video component, and extending in a negative going direction relative to said ground, an electron discharge tube having at least an anode, cathode and control electrode, a load circuit connected between said anode and cathode and also with said ground, a resistance capacity time constant circuit connected between said control electrode and said ground, and capacitive coupling means connected between said input terminal and said discharge tube cathode, said coupling means being so proportioned and configured as to permit peaks of synchronizing component to establish conduction between said cathode and control electrode during peaks of synchronizing component.

7. Apparatus according to claim 6 wherein said time constant circuit has a time constant value which is at least as large as the recurrence period of said synchronizing component.

8. Apparatus according to claim 6 wherein there is additionally provided a television signal receiving and demodulating means having its output connected with said input terminal, an automatic gain control circuit connected with said receiving means for developing an automatic gain contol voltage at a gain control terminal, means for controlling the gain of said receiving means with said control voltage, a connection from the gain control terminal to said discharge tube control electrode whereby the voltage at said control electrode is a function of both synchronizing component and automatic gain control voltage.

9. Apparatus according to claim 8 wherein there is additionally provided a synchronizing signal amplifier having its input direct current coupled to said discharge tube load circuit.

References Cited in the file of this patent

UNITED STATES PATENTS

| | | |
|---|---|---|
| 2,208,374 | Lewis | July 16, 1940 |
| 2,240,490 | Cawein | May 6, 1941 |
| 2,240,605 | Bingley | May 6, 1941 |
| 2,356,141 | Applegarth | Aug. 22, 1944 |
| 2,363,299 | Dome | Nov. 21, 1944 |
| 2,481,045 | Schroeder | Sept. 6, 1949 |
| 2,547,648 | Loughren | Apr. 13, 1951 |
| 2,566,763 | Tyler | Sept. 4, 1951 |

OTHER REFERENCES

Rider's TV Manual, vol. 4; Video Corp. of America TV, pages 4–14.